United States Patent
Leu et al.

(10) Patent No.: US 7,303,001 B2
(45) Date of Patent: Dec. 4, 2007

(54) HEAT PIPE HAVING OPERATING FLUID INCLUDING CARBON NANOCAPSULES

(75) Inventors: Charles Leu, Fremont, CA (US); Tai-Cherng Yu, Tu-Cheng, CA (US); Ga-Lane Chen, Fremont, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 400 days.

(21) Appl. No.: 10/930,328

(22) Filed: Aug. 31, 2004

(65) Prior Publication Data
US 2005/0056808 A1  Mar. 17, 2005

(30) Foreign Application Priority Data
Sep. 12, 2003 (TW) ............... 92125266 A

(51) Int. Cl.
F28D 15/00 (2006.01)
C09K 5/00 (2006.01)
H05K 7/20 (2006.01)

(52) U.S. Cl. ............ 165/104.26; 165/104.21; 252/71

(58) Field of Classification Search ......... 165/104.26, 165/104.21; 361/700; 252/71; 977/932, 977/948
See application file for complete search history.

(56) References Cited

U.S. PATENT DOCUMENTS 4,976,308 A * 12/1990 Faghri ............ 165/10
5,179,043 A * 1/1993 Weichold et al. ........... 438/584
5,947,193 A   9/1999 Adkins et al. ......... 165/104.26
6,432,320 B1 * 8/2002 Bonsignore et al. .......... 252/70
2001/0003305 A1 * 6/2001 Kabrell et al. ............ 165/80.3
2003/0086454 A1 * 5/2003 Nagano et al. ............... 372/35
2003/0163175 A1 * 8/2003 Shaw .......................... 607/89
2004/0125565 A1 * 7/2004 Chen et al. ................. 361/704

FOREIGN PATENT DOCUMENTS

CN    ZL 98110556.4    11/2002

* cited by examiner

*Primary Examiner*—Tho Duong
(74) *Attorney, Agent, or Firm*—Morris Manning Martin LLP; Tim Tingkang Xia, Esq.

(57) ABSTRACT

A heat pipe (20) includes a pipe (21), a wick (22), and an operating fluid. The wick is fixedly engaged with an inside wall of the pipe. The operating fluid is sealed in the pipe and soaks the wick. The operating fluid includes a pure liquid, and a plurality of carbon nanocapsules (23) suspended in the pure liquid. The pure liquid can be selected from the group consisting of pure water, ammonia, methanol, acetone and heptane. Each carbon nanocapsule is a polyhedral carbon cluster (231), with a metal (232) having high thermal conductivity filled therein. The operating fluid has high thermal conductivity and uniform operation, and is recyclable with no pollution of the environment. The heat pipe has correspondingly high thermal conductivity.

20 Claims, 1 Drawing Sheet

HEAT PIPE HAVING OPERATING FLUID INCLUDING CARBON NANOCAPSULES

BACKGROUND OF THE INVENTION

1. Field of the Invention

The invention relates generally to thermal transfer structures; and more particularly to an operating fluid and a heat pipe containing such operating fluid.

2. Description of Prior Art

Electronic components such as semiconductor chips are becoming progressively smaller, while at the same time heat dissipation requirements thereof are increasing. In many contemporary applications, a heat pipe is one of the most efficient systems in use for transferring heat.

Referring to FIG. 3, a typical heat pipe 10 is a vessel that comprises a pipe 11, a wick 12 and a precise amount of liquid operating fluid 13. The wick 12 is fixedly engaged with an inside wall (not labeled) of the pipe 11. The liquid operating fluid 13 is sealed in the pipe 11 and soaks the wick 12. One end of the heat pipe is an evaporator section, and the other end of the heat pipe is a condenser section. The evaporator section is disposed in thermal communication with an external heat source, while the condenser section is disposed in thermal communication with an external heat sink. Further, an adiabatic section can be adopted to connect the evaporator section to the condenser section, with heat being transferred within the heat pipe from the evaporator section to the condenser section through the adiabatic section.

An operating principle of the heat pipe 10 is as follows. Liquid operating fluid 13 is located in the evaporator section of the heat pipe 10. A heat source such as ambient hot air transfers heat 15 by conduction through the wall of the heat pipe 10 to the liquid operating fluid 13. The temperature of the liquid operating fluid 13 rises steadily commensurate with the provision of the heat 15. This temperature rise continues up to a temperature at which the liquid operating fluid 13 changes from the liquid state to a vapor state. At this vaporization temperature, the provision of additional heat 15 transforms the liquid operating fluid 13 into vaporized operating fluid 14. Vapor pressure drives the vaporized operating fluid 14 through the adiabatic section to the condenser section of the heat pipe 10. At the condenser section, the vaporized operating fluid 14 transfers the heat 15 absorbed in the evaporator section to a heat sink (not shown) located at the condenser section of the heat pipe 10, thereby transforming the vaporized operating fluid 14 back into liquid operating fluid 13. Capillary action and/or gravity return the liquid operating fluid 13 back to the evaporator section. The heat pipe 10 continues the process of transferring heat 15 as long as there is a temperature differential between the evaporator section and the condenser section of the heat pipe 10 and as long as the heat 15 is sufficient to vaporize the liquid operating fluid 13 at the evaporator section.

In order to ensure the effective operation of the heat pipe 10, the operating fluid 13 must has high thermal conductivity. Conventional heat pipes generally adopt pure liquids to act as the operating fluids. U.S. Pat. No. 6,407,922 discloses such kind of heat pipe. The heat pipe comprises a precise amount of operating fluid. The operating fluid is selected from the group consisting of pure alcohol, freon, water and acetone. However, for many applications, the thermal conductivities of these operating fluids are too low. The rate of heat transfer is too slow, and the operating efficiency of the heat pipe is unsatisfactory.

In order to enhance the thermal conductivity of pure operating fluids, metal salts or metal compounds are mixed into them. China Pat. No. 98110556.4 discloses one such kind of operating fluid. The operating fluid comprises 1000 g (grams) of pure water, and 30-50 g of potassium dichromate, 10-15 g of sodium perborate, 3-5 g of boracic acid, 1-3 g of sodium peroxide, 0.5-1.5 g of aluminum hydroxide, 0.2-0.5 g of dicobalt trioxide and 0.2-0.5 g of manganese dioxide mixed in the pure water. The thermal conductivity of the operating fluid is higher than that of pure water.

However, because the operating fluid comprises metal salts or metal compounds, during operation of the heat pipe the metal salts or metal compounds easily aggregate when the operating fluid evaporates. This reduces the thermal conductivity of the operating fluid. In addition, if the heat pipe is damaged or becomes worn out, the operating fluid is generally disposed of without recycling. This can lead to pollution of the environment. On the other hand, the cost of recycling the operating fluid is very high. Furthermore, because the operating fluid is water-based, and it can be applied only in certain kinds of heat pipes.

A new operating fluid for a heat pipe which overcomes the above-mentioned problems is desired.

BRIEF SUMMARY OF THE INVENTION

Accordingly, an object of the present invention is to provide an operating fluid which has high thermal conductivity, steady operation, and a wide range of applications, and which is environmentally friendly.

Another object of the present invention is to provide a heat pipe having the above-described operating fluid.

To achieve the first of the above-mentioned objects, the present invention provides a suspension comprising a pure liquid and a plurality of carbon nanocapsules suspended in the pure liquid. The pure liquid can be selected from the group consisting of pure water, ammonia, methanol, acetone and heptane. Each carbon nanocapsule is a polyhedral carbon cluster, with a metal having high thermal conductivity filled therein.

To achieve the second of the above-mentioned objects, the present invention provides a heat pipe comprising a pipe, a wick, and the above-described operating fluid. The wick is fixedly engaged with an inside wall of the pipe. The operating fluid is sealed in the pipe and soaks the wick.

Compared with a conventional heat pipe, the heat pipe of the present invention has the following advantages. Firstly, the metal filling in the carbon nanocapsules has high thermal conductivity, and this enhances the thermal conductivity of the operating fluid. Secondly, because the metal having high thermal conductivity is filled in the carbon nanocapsules, the carbon nanocapsules provide a uniform operating framework for the metal. That is, the metal is prevented from reacting with the pure liquid, and the metal is prevented from aggregating when the operating fluid evaporates. This ensures that the high thermal conductivity of the metal is maintained, and ensures that the operating fluid can operate evenly. Thirdly, the pure liquid of the operating fluid can be selected from the group consisting of pure water, ammonia, methanol, acetone and heptane, whereas the carbon nanocapsules are solid. Thus the heat pipe can be adapted for a wide variety of applications. In addition, because the metal received in the carbon nanocapsules is prevented from aggregating when the operating fluid evaporates, the operating fluid is recyclable. That is, if the heat pipe is damaged or becomes worn out, the operating fluid can be directly reused in the pipe of a new heat pipe. The operating fluid need not be disposed of, thus saving costs and preventing pollution of the environment.

Other objects, advantages and novel features of the invention will become more apparent from the following detailed description when taken in conjunction with the accompanying drawings, in which:

DESCRIPTION OF THE PREFERRED EMBODIMENT

Figure 1:
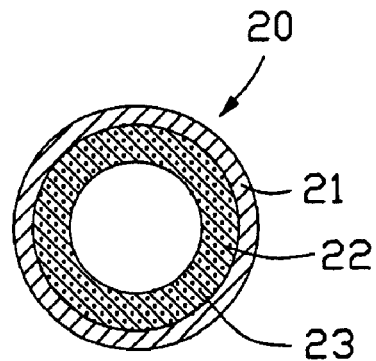
FIG. 1 is a cross-sectional view of a heat pipe of the present invention.
Figure 2:
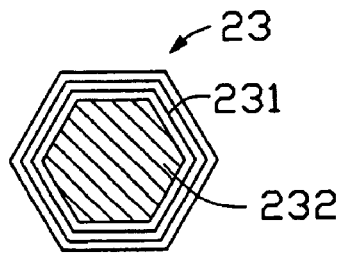
FIG. 2 is an enlarged, cross-sectional view of a carbon nanocapsule contained in operating fluid of the heat pipe of FIG. 1.
Figure 3:
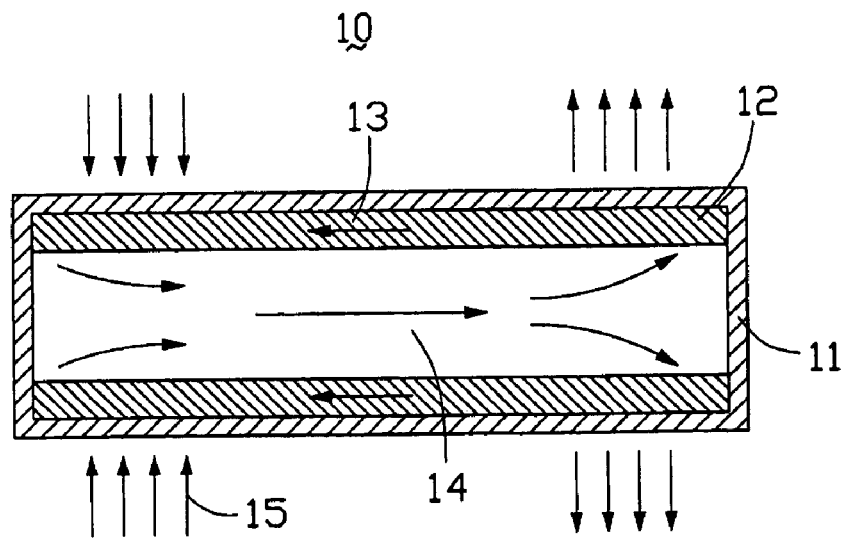
FIG. 3 is a cross-sectional view of a conventional heat pipe, showing an operating principle thereof.

Referring to FIGS. 1 and 2, an operating fluid (not labeled) of the present invention is for a heat pipe. The operating fluid is a suspension comprising a pure liquid and a plurality of carbon nanocapsules 23 suspended in the pure liquid. The pure liquid can be selected from the group consisting of pure water, ammonia, methanol, acetone, and heptane. Each carbon nanocapsule 23 is a polyhedral carbon cluster, with a metal 232 having high thermal conductivity filled therein. The polyhedral carbon cluster comprises a plurality of layers of graphite 231. The metal 232 can be selected from the group consisting of copper, aluminum, gold, silver, and any alloy thereof. A diameter of the carbon nanocapsule 23 is in the range from 2 to 60 nanometers.

A first embodiment of the operating fluid is as follows. A plurality of carbon nanocapsules 23 is mixed in pure water. A mass of the carbon nanocapsules 23 is in the range from one percent to three percent of that of the operating fluid. Each carbon nanocapsule 23 is a polyhedral carbon cluster, with copper filled therein. The polyhedral carbon cluster comprises a plurality of layers of graphite. A diameter of the carbon nanocapsule 23 is in the range from 2 to 60 nanometers.

A second embodiment of the operating fluid is as follows. A plurality of carbon nanocapsules 23 is mixed in pure water. A mass of the carbon nanocapsules 23 is in the range from one percent to three percent of that of the operating fluid. Each carbon nanocapsule 23 is a polyhedral carbon cluster, with aluminum filled therein. The polyhedral carbon cluster comprises a plurality of layers of graphite. A diameter of the carbon nanocapsule 23 is in the range from 2 to 60 nanometers.

A third embodiment of the operating fluid is as follows. A plurality of carbon nanocapsules 23 is mixed in acetone. A mass of the carbon nanocapsules 23 is in the range from one percent to three percent of that of the operating fluid. Each carbon nanocapsule 23 is a polyhedral carbon cluster, with copper filled therein. The polyhedral carbon cluster comprises a plurality of layers of graphite. A diameter of the carbon nanocapsule 23 is in the range from 2 to 60 nanometers.

A fourth embodiment of the operating fluid is as follows. A plurality of carbon nanocapsules 23 is mixed in acetone. A mass of the carbon nanocapsules 23 is in the range from one percent to three percent of that of the operating fluid. Each carbon nanocapsule 23 is a polyhedral carbon cluster, with aluminum filled therein. The polyhedral carbon cluster comprises a plurality of layers of graphite. A diameter of the carbon nanocapsule 23 is in the range from 2 to 60 nanometers.

A fifth embodiment of the operating fluid is as follows. A plurality of carbon nanocapsules 23 is mixed in heptane. A mass of the carbon nanocapsules 23 is in the range from one percent to three percent of that of the operating fluid. Each carbon nanocapsule 23 is a polyhedral carbon cluster, with copper filled therein. The polyhedral carbon cluster comprises a plurality of layers of graphite. A diameter of the carbon nanocapsule 23 is in the range from 2 to 60 nanometers.

A sixth embodiment of the operating fluid is as follows. A plurality of carbon nanocapsules 23 is mixed in heptane. A mass of the carbon nanocapsules 23 is in the range from one percent to three percent of that of the operating fluid. Each carbon nanocapsule 23 is a polyhedral carbon cluster, with aluminum filled therein. The polyhedral carbon cluster comprises a plurality of layers of graphite. A diameter of the carbon nanocapsule 23 is in the range from 2 to 60 nanometers.

A heat pipe 20 of the present invention comprises a pipe 21, a wick 22, and the above-described operating fluid. The wick 22 is fixedly engaged with an inside wall (not labeled) of the pipe 21. The operating fluid is sealed in the pipe 21 and soaks the wick 22.

The pipe 21 is a seamless metal tube. A material of the pipe 21 can be selected from the group consisting of copper, aluminum, steel, carbonic steel, stainless steel, iron, nickel, titanium, and any alloy thereof. A cross-section of the pipe 21 is circular, elliptical, square, rectangular, oblong, or rippled. A width of the pipe 21 is in the range from 2 to 200 micrometers, and a length of the pipe 21 is in the range from several micrometers (μm) to several tens of meters (m). In the preferred embodiment of the present invention, the pipe 21 is a circular steel tube, having a width of 4 micrometers and a length of 50 micrometers.

The wick 22 can be a groove type, a web type, or a sintered type. The web type wick is easily made, according to the following manufacturing process. Firstly, a web made of a suitable material is selected. The material is determined according to the type of operating fluid to be used, and is selected from the group consisting of copper, stainless steel, and iron. Secondly, the web is washed and cleaned. Thirdly, the web is rolled up, inserted into the pipe 21, and fixedly engaged with the inside wall of the pipe 21.

The groove type wick is made by defining grooves in the inside wall of the pipe 21, and then filling wicking materials in the grooves.

The sintered type wick is made by sintering a number of metal powders. A ratio of holes of the sintered type wick is in the range from forty percent to fifty percent. A size of the holes is determined by a granularity of the particles of the metal powders. A temperature of the sintering process is generally 100-200° C. lower than that of the melting point of the metal powders.

In the preferred embodiment of the present invention, a sintered type wick which is made by sintering a number of copper powders is adopted. The manufacturing process is as follows. Firstly, a mandrel is placed in the pipe 21. Secondly, a space formed between the inside wall of the pipe 21 and an outer wall of the mandrel is filled with a number of copper powders. Thirdly, the pipe 21 with the mandrel and the copper powders is placed in an oven. The copper powders are sintered for about thirty minutes at a temperature in the range from 810° C. to 880° C. Fourthly, the pipe 21 with the mandrel and the copper powders is taken out of the oven and cooled. Then the mandrel is drawn out of the pipe 21. Fifthly, the pipe 21 with the copper powders is placed in the oven, and the copper powders are sintered for about an hour.

In the preferred embodiment of the present invention, the operating fluid comprises pure water and a plurality of carbon nanocapsules 23 mixed in the pure water. A mass of the carbon nanocapsules 23 is in the range from one percent to three percent of that of the operating fluid, and a diameter of each carbon nanocapsule 23 is in the range from 2 to 60 nanometers. The carbon nanocapsule 23 is a polyhedral carbon cluster, with copper filling therein. The polyhedral carbon cluster comprises a plurality of layers of graphite 231. The carbon nanocapsules 23 are made by an arc discharge method, in which a graphite rod with copper mixed therein is used as a cathode. Alternatively, a graphite rod with aluminum mixed therein can be used as the cathode.

Compared with a conventional heat pipe, the heat pipe 21 of the present invention has the following advantages. Firstly, the metal filling in the carbon nanocapsules 23 has high thermal conductivity, and this enhances the thermal conductivity of the operating fluid. Secondly, because the metal with high thermal conductivity is filled in the carbon nanocapsules 23, the carbon nanocapsules 23 provide a uniform operating framework for the metal. That is, the metal is prevented from reacting with the pure liquid, and the metal is prevented from aggregating when the operating fluid evaporates. This ensures that the high thermal conductivity of the metal is maintained, and ensures that the operating fluid can operate evenly. Thirdly, the pure liquid of the operating fluid can be selected from the group consisting of pure water, ammonia, methanol, acetone and heptane, whereas the carbon nanocapsules 23 are solid. Thus the heat pipe 20 can be adapted for a wide variety of applications. In addition, because the metal received in the carbon nanocapsules is prevented from aggregating when the operating fluid evaporates, the operating fluid is recyclable. That is, if the pipe 21 of the heat pipe 20 is damaged or broken or becomes worn out, the operating fluid therein can be directly reused in the pipe 21 of a new heat pipe 20. The operating fluid need not be disposed of, thus saving costs and preventing pollution of the environment.

It is to be understood that the above-described embodiments are intended to illustrate rather than limit the invention. Variations may be made to the embodiments without departing from the spirit of the invention. Accordingly, it is appropriate that the appended claims be construed broadly and in a manner consistent with the scope of the invention.

What is claimed is:

1. A heat pipe comprising:
a pipe;
a wick engaged with an inside wall of the pipe; and
an operating fluid sealed in the pipe and soaking the wick;
wherein the operating fluid comprises a liquid and a plurality of carbon nanocapsules suspended in the liquid, and each of the carbon nanocapsules has a metal with high thermal conductivity received therein.

2. The heat pipe as claimed in claim 1, wherein the metal is selected from the group consisting of copper, aluminum, gold, silver, and any alloy thereof.

3. The heat pipe as claimed in claim 1, wherein the liquid is selected from the group consisting of pure water, ammonia, methanol, acetone, and heptane.

4. The heat pipe as claimed in claim 1, wherein a mass of the carbon nanocapsules is in the range from one percent to three percent of that of the operating fluid.

5. The heat pipe as claimed in claim 1, wherein a diameter of each of the carbon nanocapsules is in the range from 2 to 60 nanometers.

6. The heat pipe as claimed in claim 1, wherein the carbon nanocapsules are made by an arc discharge method.

7. The heat pipe as claimed in claim 1, wherein a material of the pipe is selected from the group consisting of copper, aluminum, steel, carbonic steel, stainless steel, iron, nickel, titanium, and any alloy thereof.

8. The heat pipe as claimed in claim 1, wherein a cross-section of the pipe is circular, elliptical, square, rectangular, oblong, or rippled.

9. The heat pipe as claimed in claim 8, wherein a width of the pipe is in the range from 2 to 200 micrometers.

10. The heat pipe as claimed in claim 1, wherein the wick is a groove type wick, a web type wick or a sintered type wick.

11. The heat pipe as claimed in claim 6, wherein in the arc discharge method, a mixture of graphite and either of copper or aluminum is used as a cathode.

12. A heat pipe comprising:
a pipe; and
an operating fluid sealed in the pipe;
wherein the operating fluid comprises a liquid and a plurality of carbon nanocapsules suspended in the liquid, and each of the carbon nanocapsules has a metal with high thermal conductivity received therein.

13. The heat pipe as claimed in claim 12, wherein the metal is selected from the group consisting of copper, aluminum, gold, silver, and any alloy thereof.

14. The heat pipe as claimed in claim 12, wherein the liquid is selected from the group consisting of pure water, ammonia, methanol, acetone, and heptane.

15. The heat pipe as claimed in claim 12, wherein a mass of the carbon nanocapsules is in the range from one percent to three percent of that of the operating fluid.

16. The heat pipe as claimed in claim 12, wherein a diameter of each of the carbon nanocapsules is in the range from 2 to 60 nanometers.

17. The heat pipe as claimed in claim 12, wherein a material of the pipe is selected from the group consisting of copper, aluminum, steel, carbonic steel, stainless steel, iron, nickel, titanium, and any alloy thereof.

18. The heat pipe as claimed in claim 12, wherein a cross-section of the pipe is circular, elliptical, square, rectangular, oblong, or rippled.

19. The heat pipe as claimed in claim 18, wherein a width of the pipe is in the range from 2 to 200 micrometers.

20. The heat pipe claimed in claim 12, further comprising a wick engaged with an inside wall of the pipe.

* * * * *